United States
Lotspeich

[11] 3,892,470
[5] July 1, 1975

[54] OPTICAL DEVICE FOR TRANSFORMING MONOCHROMATIC LINEARLY POLARIZED LIGHT TO RING POLARIZED LIGHT

[75] Inventor: James F. Lotspeich, Malibu, Calif.

[73] Assignee: Hughes Aircraft Company, Culver City, Calif.

[22] Filed: Feb. 1, 1974

[21] Appl. No.: 438,899

[52] U.S. Cl. .......................... 350/157; 350/175 DR
[51] Int. Cl. ............................................ G02b 27/28
[58] Field of Search .................... 350/157, 175 DR

[56] References Cited
UNITED STATES PATENTS 2,346,247   4/1944   Bailey et al. ............. 350/175 DR X
2,637,243   5/1953   Marx.............................. 350/157 X

*Primary Examiner*—John K. Corbin
*Attorney, Agent, or Firm*—W. H. MacAllister, Jr.; Donald C. Keaveney

[57] ABSTRACT

There is disclosed an optical polarization converter comprising a specially fabricated planoramp shaped disc of birefringent material followed by an ordinary quarterwave plate. The combined effect of the two components is to transform monochromatic linearly polarized light to ring polarized light when the former is transmitted through the device in one direction and to perform the reverse transformation when the latter is transmitted through the device in the opposite direction.

5 Claims, 5 Drawing Figures

OPTICAL DEVICE FOR TRANSFORMING MONOCHROMATIC LINEARLY POLARIZED LIGHT TO RING POLARIZED LIGHT

BACKGROUND OF THE INVENTION

The optical device disclosed herein is suitable for use in the system of my copending application Ser. No. 438,900 entitled "Electro-Optic Variable Focal Length Lens Using Optical Ring Polarizer" assigned to the same assignee as the present application and filed concurrently herewith. That application relates to a system for electrically controlling the divergence of polarized light beams such as produced by lasers. Typically, laser beams are substantially non-divergent. When used for communication, the laser beam is difficult to acquire because of such non-divergence. It is therefore, desirable to have a means for electrically controlling this divergence.

One prior means for controlling such divergence is that shown in my U.S. Pat. No. 3,424,513, which was issued Jan. 28, 1969, to J. F. Lotspeich for an "Electro-Optical Variable Focal Length Lens" and which is assigned to Hughes Aircraft Company, the assignee of this application. The apparatus of that patent used a liquid medium for each of two tandem lenses. The device is relatively difficult to build and the focal lengths of the lens systems in perpendicular directions of polarization are not exactly equal, which introduces astigmatic distortion error. The ring polarizer of the present invention makes possible a system using a single solid lens in place of the two tandem liquid lenses. The ring polarizer is also suitable for general optical application wherever one wishes to convert linearly polarized light to ring polarized light or to convert ring polarized light to linearly polarized light.

SUMMARY OF THE INVENTION

The optical device consists of a specially fabricated disc of birefringent material followed by an ordinary quarterwave plate. One face of the disc is flat or planar, and the other face is cut to a ramp surface so that the disc thickness, $b$, varies linearly with angle from a radial line between the values $b_0$ and $b_0+2\lambda/(n_e-n_0)$, wherein $n_e-n_0$ is the birefringence. In practice it is mechanically impossible to generate such a theoretical surface which includes the center and therefore a small center hole is made in the disc to be filled with an opaque plug. The disc and quarterwave plate form an optical device which is shown below to transform ring polarized light to linear polarized light.

BRIEF DESCRIPTION OF THE DRAWINGS

In the accompanying drawings like reference characters refer to like parts throughout and.

DETAILED DESCRIPTION

Figure 1:
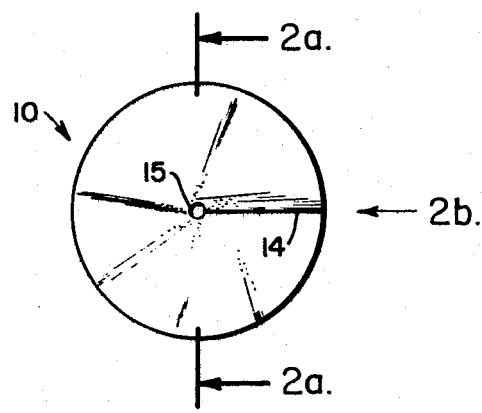
FIG. 1 is a plan view of the ramp surface of the birefringerant disc in accordance with the present invention.
Figure 2B:
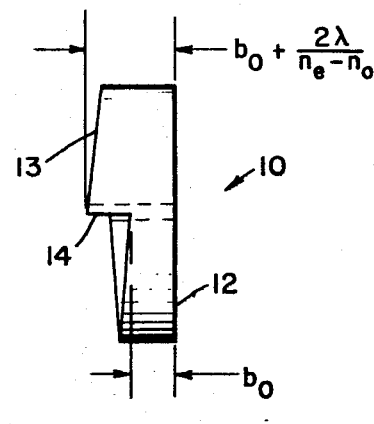
FIG. 2b is an edge elevation view looking in the direction of the arrow 2b of FIG. 1.
Figure 2A:
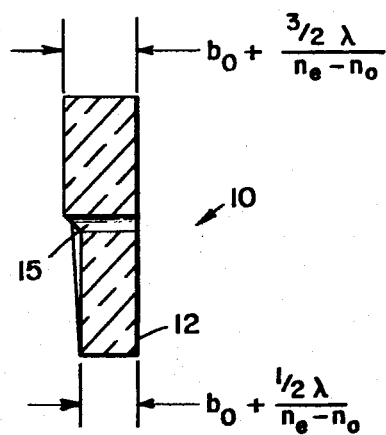
FIG. 2a is a sectional view on the line 2a—2a of FIG. 1.

To convert linearly-polarized light into ring polarized light or vice-versa, a polarization converter comprising a disc 10 of birefringent material followed by a quarter waveplate 11 is provided. One face 12 of the disc 10 is flat and the other face 13 is cut so that the disc thickness, $b$, varies linearly through a range of $2\pi$ radians as a function of the angle from a radial line, 14, at zero radians between $b_0$ and $b_0+2\lambda/(n_e-n_0)$, where the difference between the extraordinary index of refraction ($n_e$) and the ordinary index of refraction ($n_0$) is called the birefringence of the crystal 10 and where $\lambda$ is the wavelength of the transmitted radiation. In practice it is mechanically impossible to generate such a surface so that it includes the center of the disc. Therefore a small center hole 15 is cut in the disc and filled with an opaque plug. The disc itself is formed of a birefringent material.

Figure 3:
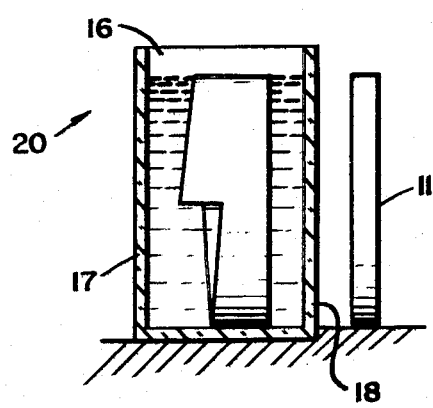
FIG. 3 is a diagramatic sectional view showing the disc of FIGS. 1 and 2 mounted in a cell and followed by a quarter waveplate; and, FIG. 4 is a diagramatic illustration of the properties of ring polarized light.

In order to prevent refraction due to the sloping first surface 13, the disc 10 should either be covered with a mating piece of homogeneous index of refraction matching material having an index of refraction equal to $\frac{1}{2}(n_e+n_0)$ such that the composite structure presents two parallel surfaces to the beam, or, as illustrated in FIG. 3, it should be immersed in an index matching fluid within a cell 20 having parallel end windows 17 and 18.

Figure 4:
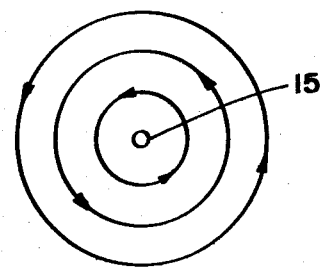

The electric vector pattern of polarization produced by passing linearly polarized light from left to right through the optical device shown in FIG. 3 is illustrated in FIG. 4.

Reference is made to Chapter 14 entitled "Optics Of Crystals" of a book entitled "Principles of Optics" by Max Born and Emil Wolf, 4th Edition, 1970, published by Pergamon Press for general background theory which is herein assumed. Attention is particularly directed to the discussion in Section 14.3.2 "Light Propagation in Uniaxial Crystals." The extraordinary and ordinary indices of refraction are explained in Section 14.4.4 "Interference Figures from Uniaxial Crystal Plates." The construction and operation of a quarterwave plate is described in Section 14.4.2 "Compensators."

Any birefringent plate of thickness $b$ whose fast and slow axes are oriented at plus and minus 45° relative to the electric vector $\vec{E}$ of an incident plane-polarized beam produces a relative phase shift $\Gamma = 2\pi b (n_e-n_0)/\lambda$ between the principal beam component, resulting in elliptical polarization. A quarter wave plate whose fast or slow axis is parallel to the original polarization reproduces a locally plane polarized beam rotated at an angle $\Gamma/2$ from its original direction.

We show this with the Jones calculus, using an incident vertically-polarized beam.

$$\begin{pmatrix} E_x \\ E_y \end{pmatrix} = \begin{pmatrix} e^{-j\frac{\pi}{4}} & 0 \\ 0 & e^{+j\frac{\pi}{4}} \end{pmatrix} \underbrace{\begin{pmatrix} \frac{1}{\sqrt{2}} & -\frac{1}{\sqrt{2}} \\ \frac{1}{\sqrt{2}} & \frac{1}{\sqrt{2}} \end{pmatrix} \begin{pmatrix} e^{+j\frac{\Gamma}{2}} & 0 \\ 0 & e^{-j\frac{\Gamma}{2}} \end{pmatrix} \begin{pmatrix} \frac{1}{\sqrt{2}} & \frac{1}{\sqrt{2}} \\ -\frac{1}{\sqrt{2}} & \frac{1}{\sqrt{2}} \end{pmatrix}}_{} \begin{pmatrix} 0 \\ 1 \end{pmatrix}$$

$\frac{\lambda}{4}$ plate     birefringent plate oriented at 45°    incident electric vector $$= \begin{pmatrix} e^{-j\frac{\pi}{4}} & 0 \\ 0 & e^{+j\frac{\pi}{4}} \end{pmatrix} \begin{pmatrix} \cos\frac{\Gamma}{2} & j\sin\frac{\Gamma}{2} \\ j\sin\frac{\Gamma}{2} & \cos\frac{\Gamma}{2} \end{pmatrix} \begin{pmatrix} 0 \\ 1 \end{pmatrix}$$

$$= \begin{pmatrix} e^{-j\frac{\pi}{4}}\cos\frac{\Gamma}{2} & je^{-j\frac{\pi}{4}}\sin\frac{\Gamma}{2} \\ je^{+j\frac{\pi}{4}}\sin\frac{\Gamma}{2} & e^{+j\frac{\pi}{4}}\cos\frac{\Gamma}{2} \end{pmatrix} \begin{pmatrix} 0 \\ 1 \end{pmatrix} = \begin{pmatrix} e^{+j\frac{\pi}{4}}\sin\frac{\Gamma}{2} \\ e^{+j\frac{\pi}{4}}\cos\frac{\Gamma}{2} \end{pmatrix} \quad \text{Q.E.D.}$$

Now if the thickness of the disc 10 varies in such a way that $\Gamma/2 = \gamma + 2N\pi$ where $N$ = any integer and where $\gamma$ is the clockwise angular position measured from the radial ridge line, then the emerging beam will have components $$E_x = \sin\gamma$$
$$E_y = \cos\gamma$$

which characterize the ring polarization required and shown in FIG. 4 (neglecting the unimportant common phase factor $e^{+j\pi/4}$). The explicit angular dependence of the thickness $b$ then becomes $b = [\Gamma\lambda/2\pi(n_e-n_o)] = [\lambda/\pi(n_e-n_o)] (\gamma + 2N\pi)$ and $b_o = (2N\lambda/n_e-n_o)$. When $\gamma$ increases from zero to $2\pi$, $b = b_o + (2\lambda/n_e-n_o)$.

It is thus seen that plane polarized light which is incident on the plano-ramp surfaced disc 10 will emerge from it as elliptically polarized light which in turn is converted to ring polarized light by passage through the quarterwave plate. Conversely, ring polarized light which is past first through the quarterwave plate and then through the plano-ramp disc will be converted to linear polarized light.

What is claimed is:

1. A polarization converter for light of a predetermined wavelength comprising in combination:
   a. a quarterwave plate;
   b. a disc of birefringent material, said disc having one planar surface and a second opposed ramp surface, said ramp surface being cut so that the thickness of the disc varies linearly through a range of $2\pi$ radians as a function of the angle from an arbitrary radial line at zero radians between an initial thickness $b_0$, and a final thickness equal to $b_0$ plus $2\lambda$ divided by the birefringence of the crystal where $\lambda$ is the predetermined wavelength of the radiation to be transmitted through the polarization converter.

2. A polarization converter as in claim 1 wherein a hole is drilled through the center of said birefringent disc, said hole being filled with an opaque material.

3. A device as in claim 2 wherein said birefringent disc is immersed in a liquid for matching the index of refraction thereof to ambient, said disc and said liquid being contained in a cell having plane parallel windows.

4. A bidirectional optical device for transforming monochromatic linear polarized light to ring polarized light and vice-versa comprising in combination along a common optic axis:
   a. a plano-ramp shaped disc of birefringent material having a thickness which varies linearly through $2\pi$ radians as a function of angle from an initial radial line from a minimum value at zero radians to a maximum value at $2\pi$ radians, said maximum value being equal to said minimum value plus twice the wavelength of the radiation to be transmitted through the disc divided by the birefringence of the material of the disc; and
   b. a quarter waveplate positioned in optically coacting relationship with said disc.

5. A device as in claim 4 wherein said disc has an aperture formed at the center thereof, said aperture being filled with opaque material.

* * * * *